N. W. STORER.
REGENERATIVE CONTROL.
APPLICATION FILED DEC. 4, 1914. RENEWED JUNE 19, 1917.

1,245,397.

Patented Nov. 6, 1917.
4 SHEETS—SHEET 1.

WITNESSES:
Fred A. Lind.
W. R. Coley

INVENTOR
Norman W. Storer
BY
Wesley F. Carr
ATTORNEY

UNITED STATES PATENT OFFICE.

NORMAN W. STORER, OF PITTSBURGH, PENNSYLVANIA, ASSIGNOR TO WESTINGHOUSE ELECTRIC AND MANUFACTURING COMPANY, A CORPORATION OF PENNSYLVANIA.

REGENERATIVE CONTROL.

1,245,397.  Specification of Letters Patent.  Patented Nov. 6, 1917.

Application filed December 4, 1914, Serial No. 875,436. Renewed June 19, 1917. Serial No. 175,710.

*To all whom it may concern:*

Be it known that I, NORMAN W. STORER, a citizen of the United States, and a resident of Pittsburgh, in the county of Allegheny and State of Pennsylvania, have invented a new and useful Improvement in Regenerative Control, of which the following is a specification.

My invention relates to control systems for electric motors, and it has special reference to such systems as are adapted for use in electric railway service.

One object of my invention is to provide a system of the above-indicated character which shall be adapted for regeneration to the line during retardation periods in order to effect economy in operation and a material reduction in the wear of brake-shoes and wheels.

Another object of my invention is to provide a relatively simple and inexpensive regenerative control system which shall avoid the use of storage batteries or other auxiliary sources of current supply during the braking periods, and which shall maintain a substantially constant regenerated current while the motor speed is decreasing.

While my invention is particularly adapted for the control of railway vehicles, it is not limited to any specific class of service but may be utilized in the control of automobiles and other road vehicles or in the control of cranes, hoists, and other electrically operated devices.

In the prior art, many regenerative braking systems have entailed the use of storage batteries or other independent source of current, particularly field-current regulation, during the braking periods, thereby adding to the equipment an element of considerable expense and one that requires some care in maintenance.

According to my present invention, I provide a regenerative system from which the independent sources of current supply referred to above have been eliminated, their places being effectively taken by a plurality of counter-electromotive force (C. E. M. F.) cells, as hereinafter described. The C. E. M. F. cells may be of any suitable type, severally comprising for example, a plurality of metallic plates partially immersed in an electrolyte. As is well known, such cells offer a comparatively high resistance to the passage of current that corresponds to charging current in the case of storage batteries, and are capable of an almost negligible discharge, but present a materially reduced resistance to the passage of current from an external source in the discharging direction. However, in order to begin regenerative braking, some simple auxiliary apparatus may be required in many cases; although, in some instances, the C. E. M. F. cells alone may afford an initial impulse to effect the subsequent proper directional excitation of the field winding. For example, a storage battery of relatively small capacity may be initially connected across the motor field winding to build up the field current in the proper direction and then be excluded from circuit; or, the generating motor may be allowed to initially build up its voltage by connection across a suitable shunting resistor, the C. E. M. F. cells being included in their respective circuit, namely, in parallel to the full field winding and a field-regulating resistor. Regeneration is effected by then connecting the motor to the supply circuit and excluding the shunting resistor circuit.

In this way, a simple, economical, and effective means is provided for regenerative current regulation.

The advantages of C. E. M. F. cells over a storage battery, which is sometimes employed for the regulating function intended, in addition to the relatively low first cost and maintenance, may be set forth as follows: The C. E. M. F. cells will act to maintain a practically constant voltage across the field winding, which voltage corresponds to the initial, or highest, regenerating speed of the machine. Thereafter, as the machine speed decreases, the C. E. M. F. cells permit just the proper amount of exciting current to traverse the field winding and absorb the remaining current, of whatever value, while correspondingly altering their resistance, or in other words, while maintaining a practically constant voltage at their terminals. By suitable setting of the limit switch, the regenerated current may be maintained at any suitable value greater than the exciting field current that is necessary at the corresponding machine speed, thereby preventing the conversion of the regenerating machine to a motor by reason of its generated voltage becoming less than the supply-circuit voltage. The exciting field current being thus maintained at its proper relative value during regeneration, the armature voltage and, consequently, the regenerated current will tend to remain substantially constant.

In order to adapt the system of control to regenerative service and to secure a maximum braking effort without injuring the electric motors or the other apparatus with which the vehicle is equipped, I preferably provide automatic means, in the form of a differential relay switch, for automatically connecting a propelling motor to the supply circuit when the electro-motive force generated at the motor terminals bears a predetermined relation to the supply-circuit voltage.

I also provide automatic means for regulating the field excitation of the motor during the period when it is acting as a generator, whereby a substantially constant braking current is delivered to the supply circuit. In addition to the foregoing, I so interlock the various control switches and apparatus of the system as to permit of the normal operation of the motor or motors in accelerating the vehicle, by throwing the master controller in one direction, and of automatic adjustment of the circuits for regenerative braking accompanied by connection of the motor or motors to the circuit at the proper time, by operating the master controller in the opposite direction.

In the accompanying drawing.

Fig. 4 is a diagrammatic view of the control circuits, including the actuating coils and the interlocks which form parts of the main-circuit switches and control apparatus shown in Fig. 3. In order to simplify the circuit connections, however, the interlocks which are grouped with the various switches, are distributed, and each of them is marked to indicate the switch or control device with which it is associated and by which it is operated. The familiar arrangement of main and auxiliary contact members is illustrated in Fig. 4^A in connection with the switch LS1.

It will be understood that, whereas, for convenience and clearness of illustration, I have shown my invention as embodied in a certain relatively simple control system, the application thereof is not so restricted, as the invention may readily be incorporated in various other types of control systems.

Figure 1:
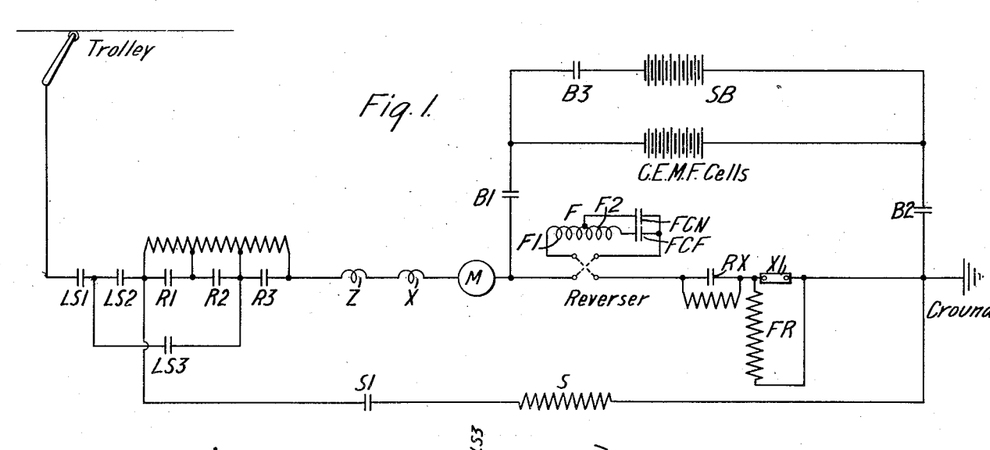
Figure 1 is a simplified diagrammatic view of the main circuits of a system of control embodying my invention.
Figure 2:
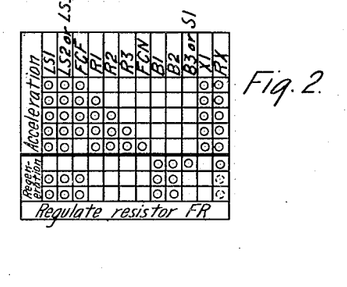
Fig. 2 is a sequence chart of well-known form for indicating the operation of the various switches. These two figures afford a simple general view of the main circuit layout, which is shown more in detail in Fig. 3.

Referring to Fig. 1 of the drawings, the system here shown comprises a supply circuit which, for convenience, is marked "Trolley"; a return circuit conductor marked "Ground"; an electric motor having an armature M and a subdivided field magnet winding F comprising portions F1 and F2; field change-over switches FCF and FCN, which are shown as controlled by a single actuating coil FC, (Fig. 3), the switch FCF, corresponding to the full field winding, being normally closed and the switch FCN being normally open: a plurality of line switches LS1, LS2 and LS3, the latter being used only during regeneration; a plurality of resistor sections respectively adapted to be short-circuited by suitable switches R1, R2, R3 and RX, the latter being opened only during regeneration, for a purpose hereinafter specified; a field regulating resistor FR, which is employed for current-regulating purposes during the braking periods and which is short-circuited at other times by a switch X1; a plurality of limit or throttle switches Z and X, respectively; a shunting resistor S that is adapted to be connected across the entire motor by a switch S1: a battery of counter-electromotive force cells, marked "C. E. M. F. cells"; a plurality of switches B1 and B2 for connecting the said cells across the full field winding F and the field-regulating resistor FR during regeneration; a storage battery SB, of relatively small capacity, that is adapted for parallel connection with the C. E. M. F. cells by a switch B3, under predetermined conditions; and a motor reversing switch marked "Reverser".

Figure 3:
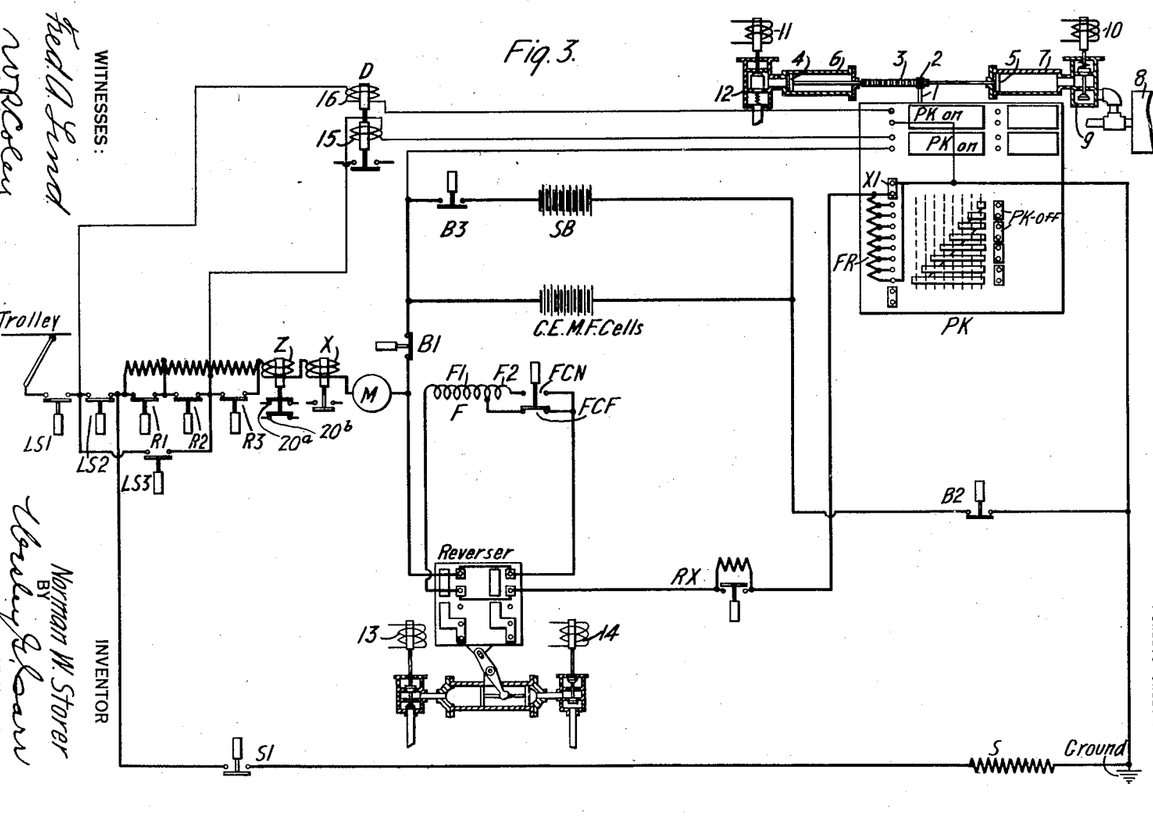
Fig. 3 is a diagrammatic view of a system of electric motor control embodying my invention, the main-circuit connections and the switches and control apparatus which are directly associated therewith being shown complete, according to the usual diagrammatic methods of representation.
Figures 4, 4A:
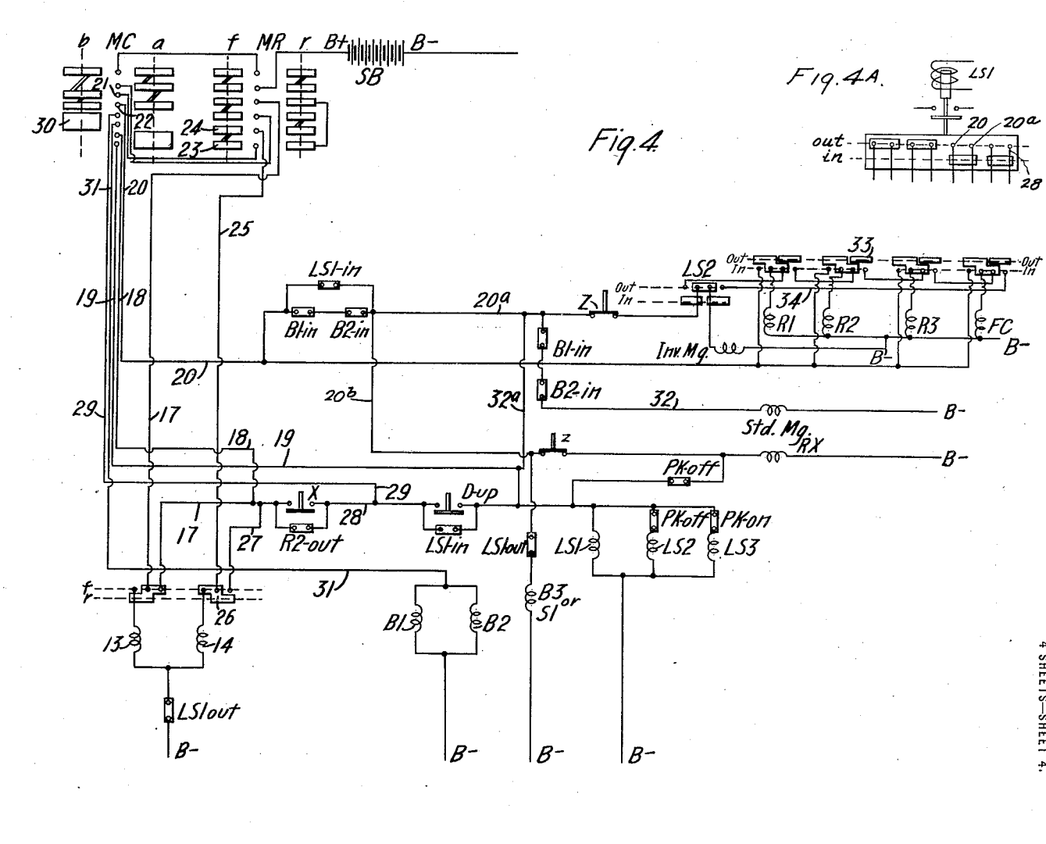

In Fig. 3, the various motor-controlling switches are shown as of a familiar electrically-controlled type that is suitable for operating the interlocks shown in Fig. 4; the operating mechanism and the contact members of the reverser are illustrated; and a controller PK for governing the resistor FR, and a differential relay switch D having coils respectively connected across the motor and across the line, are shown.

The operation of the system with reference to the main circuits only will first be discussed and, subsequently, the control circuits by which the desired main circuit changes are accomplished, will be traced.

Assuming that it is desired to accelerate the motor, switches LS1, LS2 and RX are closed, thereby establishing a circuit from the trolley through line switches LS1, and LS2, resistor sections that correspond to switches R1, R2 and R3, limit switches Z and X, the armature M, certain contact members of the reverser, the full field magnet winding F, contact members of the switch FCF; and the switches RX and X1 to "ground". The motor and the resistor sections are thus connected in series across the supply circuit.

The resistor sections are then successively short-circuited—dependent upon the limit switch Z—as hereinafter described, thus impressing full voltage upon the motor; and the portion F2 of the field winding is excluded from circuit, to further increase the motor speed, by closure of the switch FCN and the opening of the switch FCF.

In the braking position, which is reached after disconnection of the motor from the line and the opening of all switches, either of two methods may be employed to inaugurate regeneration, after the field magnet winding has been reversed with respect to the armature, for a well-known reason. One method comprises the closure of switches B1, B2 and B3, followed by the actuation of the controller PK to its braking positions and the subsequent connection of the motor to the supply circuit and the opening of the switch B3, as hereinafter more fully described. The storage battery SB and the C. E. M. F. cells are thus initially connected in parallel relation across the reversed full field winding F and the field regulating resistor FR to build up the motor voltage in the proper direction, and the storage battery is then excluded from circuit. The battery can thus be of relatively small capacity and cost, inasmuch as it is used only intermittently. The other method comprises the initial closure of the switches B1, B2 and S1, whereby the resistors R1, R2 and S are connected across the motor, the voltage of which is thus built up, as the PK controller gradually excludes resistance from the field circuit. After the connection of the motor to the supply circuit, as set forth below, the switch S1 is opened. In either case, the resistor FR is varied by the controller PK to increase the field excitation as the motor speed decreases.

The line switches LS1 and LS2 are automatically dependent upon the differential relay switch D and, consequently, when a predetermined relation exists between the voltage generated at the terminals of the motor armature and the voltage of the line, the motor is automatically connected to the line by the closing of the line switches. The controller PK is thereupon automatically regulated, as hereinafter pointed out, to so govern the field-regulating resistor as to maintain a substantially constant braking current. This obviously involves the gradual exclusion of the resistor to maintain a substantially constant generated voltage at the terminals of the motor, as its speed decreases.

The PK controller is intended to be representative of any suitable means for automatically governing the field-regulating resistor, and I do not wish to be limited to any specific control apparatus.

The PK controller comprises a plurality of contact fingers which are connected to intermediate points in the field-regulating resistance; and suitable contact segments which are adapted to successively engage the fingers and gradually short-circuit the resistance in a well-known manner.

The controller is preferably in the form of a drum, which is shown developed into a single plane in acordance with a familiar practice, and is provided with a shaft 1 to which a pinion 2 is secured. The drum is actuated by a rack 3 which meshes with the pinion 2 and is connected, at its respective ends, to pistons 4 and 5 which operate in cylinders 6 and 7. Fluid pressure is admitted from a tank or reservoir 8, through an electromagnetically controlled valve 9, to the cylinder 7, when an actuating coil 10 for the valve is deënergized, and fluid pressure is admitted from the tank or reservoir to the cylinder 6 when an actuating coil 11 for the other magnet valve 12 is energized.

The arrangement of parts is such that, if both magnet valves are deënergized, the fluid pressure will be admitted through the valve 9 to the cylinder 7 and will so actuate the piston 5 and the rack 3 as to throw the PK drum to its "off" position.

If magnet valve 12 is energized, fluid pressure will be admitted to the cylinder 6, but no motion of the drum will result, inasmuch as the pressures are then balanced on the two sides of the piston member. A motion of the drum may, however, be produced by subsequently energizing the coil 10 of the valve 9, since, by this means, the valve 9 will cut off the supply of pressure from the reservoir and will open its exhaust port. The drum may be stopped at any position by merely deënergizing the coil 10, and it may be returned to its off position by merely deënergizing the coil 10, and it may be returned to its off position by merely deënergizing both of the coils 10 and 11.

The valve magnet 12, which, when energized, is open to admit fluid pressure to the cylinder and, when deënergized, is closed to exhaust air from the cylinder, will hereinafter be referred to as a "standard" valve magnet; while the valve magnet 9 which is open to admit fluid pressure to the cylinder, when deënergized, and exhausts the air from the cylinder, when energized, will hereinafter be referred to as an "inverted" valve magnet.

The C. E. M. F. cells are individually old and well-known and their hereinbefore-outlined peculiar characteristics are deemed to be sufficiently familiar to those skilled in the art to obviate the necessity of any further exposition.

The "reverser" may be of any suitable type, but preferably comprises a drum section that is adapted to occupy two positions, one for forward and the other for reverse operation of the vehicle. It is preferably pneumatically operated, and is controlled by valves having actuating coils 13 and 14.

The limit switch Z is opened when energized above a predetermined value, and the limit switch X is closed when energized above a predetermined value.

The differential relay switch D is provided with a coil 15 which, when energized, tends to raise it, and a coil 16 which tends to hold it down.

The coil 15 is connected in shunt relation to the armature M when the PK drum occupies any "on" position by reason of the interlocking contact member PK—on that is disposed in the circuit of the coil.

The coil 16 is similarly connected across the supply circuit during the "on" position of the PK drum by reason of the inclusion of an interlock—PK—on in the coil circuit.

Referring to Fig. 4 of the drawings, the control circuits here shown are governed by a master controller MC adapted to occupy an "off" position, an accelerating position $a$ and a braking position $b$; and a master reverser MR adapted to occupy a forward position $f$ and a reversing position $r$.

Energy may be supplied to the control circuits from any suitable source, such as a control battery SB, having a positive terminal which, together with its connected conductors, is marked B+ and a negative terminal which, with its connected conductors, is marked B—.

Figure 5:
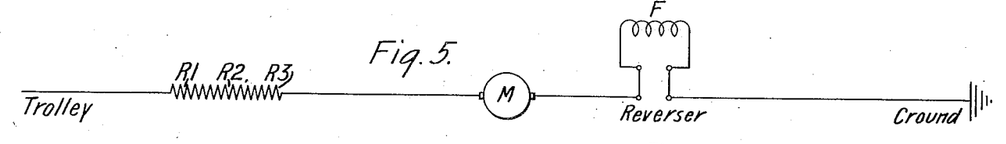
Figs. 5 to 9, inclusive, are simplified diagrammatic views of various sets of main circuit connections that are employed during acceleration or regeneration.

Assuming that the master controller is moved from its "off" position to its accelerating position, and that the master reverser and main reverser occupy their forward running positions, a circuit is established from the B+ terminal of the battery through the master reverser, master controller, main reverser, and conductors 17, 18 and 19 to the coils of the line switches LS1 and LS2, and from the conductor 19 through an interlock PK—off to the coil of the switch RX, thereby closing the switches and connecting the motor in series with the resistors R1, R2 and R3 across the supply circuit, as indicated in Fig. 5. The switch LS3 remains open by reason of the exclusion from its control circuit of an interlock PK—on.

Figure 6:
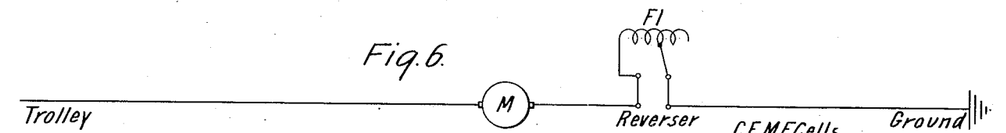

A second circuit is thereupon established from the master controller, through conductor 20, interlock LS1—in, conductor 20ª, contact members of the limit switch Z, in its lower position, a second interlock LS2—in and then progressively, and dependent upon the limit switch Z, to the coils of the switches R1, R2, R3 and the coil FC, in a well-known manner. The motor is thus connected in full series position with a weakened field flux, as illustrated in Fig. 6.

Assuming that the vehicle propelled by the motor is operating at or above a predetermined speed, that the master controller has been returned to its off position, permitting all the switches to open, and is moved to its braking position; under these conditions, energy is first supplied from the B+ terminal of the battery SB to energize the contact members that respectively engage control fingers 21 and 22. A circuit is thus established from the finger 21, through contact members 23 and 24 of the master reverser, conductor 25 and contact member 26 of the main reverser to the reversing coil 14, thereby throwing the reverser to the reversed position, without requiring the actuation of the master reverser. The purpose of the reversal of the series field or of the armature prior to establishing the regenerative connections is well known to those skilled in the art.

Upon actuation of the main reverser, a circuit is completed from the contact member 26, through conductors 27, interlock R2—out, conductors 28 and 29, contact member 30 of the master controller, conductor 31, and the coils of the switches B1 and B2. The closure of these switches establishes a circuit from the energized control finger 22, through conductor 20, interlocks B1—in and B2—in, conductor 20ª, contact members of the limit switch Z and interlock LS2—out, to the inverted valve magnet of the controller PK. Another connection is also made from the conductor 20ª, through interlocks B1—in and B2—in, and conductor 32, to the coil of the standard valve magnet. A further circuit is completed from conductor 20ª, through conductor 20ᵇ interlock LS1—out and the actuating coil of either the switch B3 or S1, as the case may be, to the negative conductor B—. The C. E. M. F. cells are thus connected across the full field magnet winding F of the motor and the field-regulating resistor FR, and either the storage battery SB is connected in parallel relation with the C. E. M. F. cells, or the resistors R1, R2 and S are connected across the entire motor, according as the switch B3 or S1 is closed. As mentioned above, in some cases it may be unnecessary to employ the battery SB or resistor S for starting regeneration.

The coil of the switch RX is energized simultaneously with the valve magnet coils, from the conductor 20ª, through conductor $20^b$, and contact members of the high-current limit switch Z, the resistor RX being thus initially short-circuited.

Since two valve magnet coils are simultaneously energized, the controller PK will continue to move step-by-step until the electro-motive force across the armature terminals reaches a predetermined value in excess of the line voltage, when the differential relay switch D will be raised. Moreover, provided the current traversing the armature circuit is sufficiently high, the limit switch Z will be raised to deënergize the coil of the RX switch and insert the resistor RX in circuit.

The raising of the switch D completes a circuit from the conductor 28, through contact members D—up to the coils of the line switches LS1 and LS3, which are thus closed to complete regenerative connection to the line with the resistors R1, R2 and R3 included in circuit. See Fig. 7.

Figure 7:
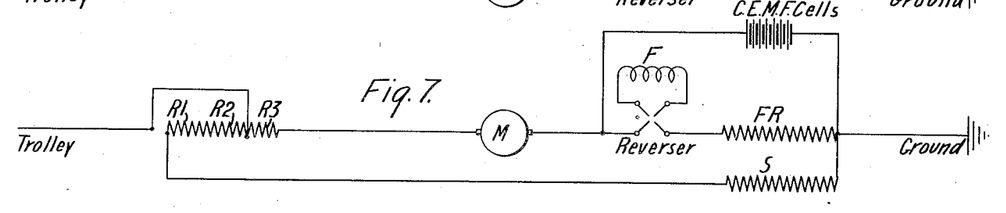

The switch LS2 remains open by reason of the exclusion from its control circuit of the interlock, PK—off. The resistor R3 is maintained in circuit throughout regeneration to act as a buffer by lessening the effects of current surges and voltage fluctuation.

Figure 8:
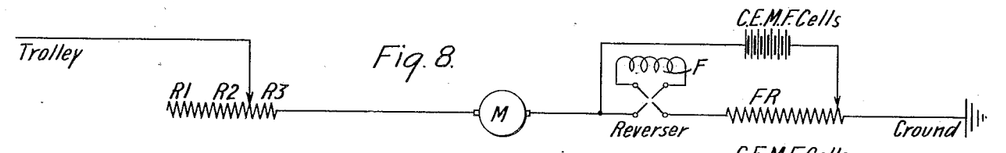

As soon as the switch LS1 closes, the switch B3 or S1, as the case may be, is opened, by reason of the inclusion in its control circuit of the interlock LS1—out. The auxiliary circuit for inaugurating regeneration is thus permanently interrupted. (See Fig. 8.)

Upon the closure of the line switches LS1 and LS3, the low-current limit switch X is raised and an interlock LS1—in bridges the contact members D—up, thereby insuring the maintenance of the closure of the line switches.

The coil of the switch RX may also be energized, dependent only upon the position of the high-current limit switch Z.

The two valve magnet coils of the controller PK being thus simultaneously energized, the field regulating resistance FR will be gradually short-circuited, dependent upon the limit switch Z. Simultaneously, the resistor RX is short-circuited when the regenerated current falls below a predetermined value which permits the limit switch Z to assume its lower position, and is included in the field circuit when the current rises above a second predetermined value which effects the raising of the limit switch. It has been found that, in practice, the switch flutters open and closed like the regulating contact members of a Tirrill regulator, and the combination of the automatically governed controller PK and the fluttering RX switch secures to the control system a relatively high and very satisfactory degree of maintenance of the regenerated current within desirably narrow limits.

Figure 9:
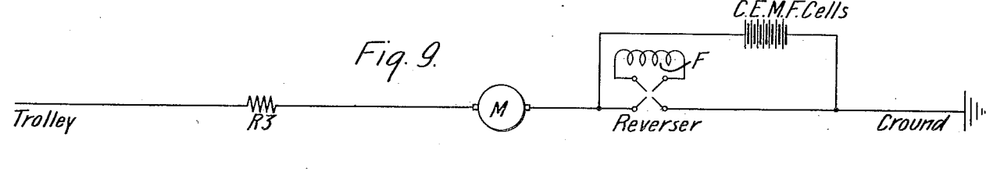

Provided the supply circuit voltage remains substantially constant, then, as the speed of the vehicle decreases, the PK controller is gradually moved to its final position, wherein all the resistance FR is short-circuited, as indicated in Fig. 9. However, if the supply-circuit voltage fluctuates considerably, as is usually unavoidable in trolley circuits of the class in question, then the direction of movement of the PK controller is governed by the relative values of the variations in voltage between the regenerated and the supply-circuit voltage, as will be understood. At a predetermined relatively low speed, the low-current limit switch X drops out, whereupon the master controller MC may be moved to its "off" position to deënergize the coils of the line switches LS1 and LS2, to disconnect the motor from the line, open all other switches and cause the controller PK to return to its off position.

In order to avoid confusion of nomenclature, it should be understood that, by the term "counter-electromotive force battery" as employed in the claims, I intend to include only the kind of battery set forth in the first part of this specification as "counter-electromotive force cells," or the full equivalent thereof.

The circuit connections and the arrangement of apparatus herein set forth may, of course, be varied within the spirit and scope of my invention. The invention is, for example, not limited to the single motor system I have shown for simplicity and clearness, but may readily be applied to two, four or other motor equipments wherein series-parallel or other types of control are employed. I, therefore, desire that only such limitations shall be imposed as are indicated in the appended claims.

I claim as my invention:

1. In a system of control, the combination with a supply circuit and an electric motor having an armature and a field magnet winding, of a counter-electromotive force battery adapted to be connected in circuit with the field winding, means for varying the resistance of the field winding circuit under predetermined conditions, and automatic means for connecting the motor to the supply circuit to return energy thereto and to retard the motor when a predetermined voltage relation exists between the motor armature and the supply circuit.

2. In a system of control, the combination with a supply circuit and an electric motor having an armature and a field magnet winding, of a counter-electromotive force battery adapted to be connected in parallel-circuit relation with the field winding, a field-regulating resistor, means for carying said resistor under predetermined conditions, and automatic means for connecting the motor to the supply circuit to return energy thereto and to retard the motor when a predetermined voltage relation exists between the motor armature and the supply circuit.

3. In a system of control, the combination with a supply circuit and an electric motor having an armature and a field magnet winding, of a normally open-circuited counter-electromotive force battery, a normally short-circuited field-regulating resistor, and automatic means for connecting said battery across the field winding and the resistor and regulating said resistor and connecting the motor to the supply circuit when the voltage at the motor terminals exceeds the voltage of the supply circuit by a predetermined amount.

4. A control system comprising a supply circuit, an electric motor, control means for effecting the acceleration of the motor, a counter-electromotive force battery, a regulatable resistor, and other control means for connecting the battery and the resistor in a local circuit with the motor field magnet winding and regulating said resistor and connecting the motor to the supply circuit to return energy thereto.

5. A control system comprising a supply circuit, an electric motor having an armature and a field magnet winding, a counter-electromotive force battery, a regulatable resistor, means for connecting the battery and the resistor in a local circuit with the motor field winding and for regulating said resistor, and a differential relay switch dependent upon a predetermined voltage relation between the supply-circuit and the motor armature for connecting the motor to the supply circuit to return energy thereto when the motor is operating as a generator.

6. A system of control for braking an electric motor comprising a supply circuit, an electric motor having an armature and a field magnet winding, a counter-electromotive force battery, a variable resistor, means for connecting the battery and the resistor in circuit with the field magnet winding, means for regulating said variable resistor in accordance with the current and resistor in accordance with the current and electro-motive force generated by the motor armature, and means for connecting the motor to the supply circuit when the voltage generated by the motor armature attains a predetermined value.

7. A system of control for braking an electric motor comprising a supply circuit, an electric motor having an armature and a field magnet winding, a counter-electromotive force battery, a variable resistor, means for connecting the battery in parallel with the field winding and the variable resistor, means for automatically regulating said resistor in accordance with the currents and electromotive force generated by the motor armature, and means for automatically connecting the motor to the supply circuit when said generated electromotive force exceeds the supply circuit voltage by a predetermined amount.

8. A system of control for braking an electric motor comprising a supply circuit, an electric motor having an armature and a field magnet winding, a counter-electromotive force battery, a variable resistor, means for connecting the battery in parallel with the field winding and the variable resistor, means for automatically connecting the motor to the supply circuit when the voltage generated by the armature attains a predetermined value, means for regulating said variable resistor, and means automatically controlling said regulating means to maintain the current generated by the motor armature in excess of a predetermined value until the motor speed has diminished below a predetermined value.

9. A system of control for braking an electric motor comprising a supply circuit, a motor having an armature and a field magnet winding, a counter-electromotive force battery, a variable resistor, means for inaugurating regenerative operation of the motor, means for subsequently regeneratively connecting the motor to the supply circuit with the battery in parallel with the field magnet winding and variable resistor, means for thereupon excluding said inaugurating means from circuit, and means for automatically regulating said variable resistor to maintain a substantially constant braking current.

10. A system of control for braking an electric motor comprising a supply circuit, a motor having an armature and a field magnet winding, a counter-electromotive force battery, a variable resistor, auxiliary means for initially building up the voltage of the motor as a braking generator, automatic means for subsequently regeneratively connecting the motor to the supply circuit with the battery in parallel with the field magnet winding and variable resistor when a predetermined voltage relation exists between the motor armature and the supply circuit, and means for thereupon excluding said auxiliary means from circuit.

11. A system of control for braking an electric motor comprising a supply circuit, a motor having series-connected armature and field magnet windings, a counter-electromotive force battery, a variable resistor, auxiliary means for initially building up the voltage of the motor as a braking generator, a differential relay switch for subsequently regeneratively connecting the motor to the supply circuit with the battery in parallel with the field magnet winding and variable resistor when a predetermined voltage relation exists between the motor armature and the supply circuit, means for thereupon excluding said auxiliary means from circuit and means for automatically regulating said variable resistor in accordance with the current and voltage generated by the motor armature.

In testimony whereof, I have hereunto subscribed my name this 28th day of Nov., 1914.

NORMAN W. STORER.

Witnesses:
D. C. HERSHBERGER,
B. B. HINES.